(12) United States Patent
Sundareswara et al.

(10) Patent No.: US 10,964,132 B2
(45) Date of Patent: Mar. 30, 2021

(54) DETECTING FAULT STATES OF AN AIRCRAFT

(71) Applicant: THE BOEING COMPANY, Chicago, IL (US)

(72) Inventors: Rashmi Sundareswara, Topanga, WA (US); Tsai-Ching Lu, Thousand Oaks, CA (US); Franz D. Betz, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 213 days.

(21) Appl. No.: 15/966,188

(22) Filed: Apr. 30, 2018

(65) Prior Publication Data

US 2019/0333294 A1    Oct. 31, 2019

(51) Int. Cl.
*G07C 5/08* (2006.01)
*B64D 45/00* (2006.01)
*G07C 5/00* (2006.01)
*G06N 20/00* (2019.01)

(52) U.S. Cl.
CPC .......... *G07C 5/0808* (2013.01); *B64D 45/00* (2013.01); *G06N 20/00* (2019.01); *G07C 5/008* (2013.01); *B64D 2045/0085* (2013.01)

(58) Field of Classification Search
CPC ................................................. G07C 5/0808
See application file for complete search history.

(56) References Cited

U.S. PATENT DOCUMENTS

| | | | |
|---|---|---|---|
| 9,822,731 B2* | 11/2017 | Kupratis | F02K 3/11 |
| 10,124,893 B1* | 11/2018 | Aalund | B64C 39/024 |
| 10,474,789 B2* | 11/2019 | Ethington | G06F 30/15 |
| 2008/0031548 A1* | 2/2008 | Brinson | G06T 5/008 382/305 |
| 2009/0228160 A1* | 9/2009 | Eklund | G06F 11/008 701/3 |
| 2009/0228409 A1* | 9/2009 | Eklund | G06F 11/008 706/12 |

(Continued)

OTHER PUBLICATIONS

Byington, Carl S., et al., "In-Line Health Monitoring System for Hydraulic Pumps and Motors," IEEE Aerospace Conference Proceedings, Feb. 2003, 10 pages.

(Continued)

*Primary Examiner* — Alex C Dunn
(74) *Attorney, Agent, or Firm* — Womble Bond Dickinson (US) LLP

(57) ABSTRACT

An apparatus for detecting fault states of an aircraft is provided. The apparatus receives training data including operational parameters of the aircraft operating over a plurality of training flight legs and applies a first clustering algorithm separately to the training data to produce first clustered data. The apparatus applies a second clustering algorithm to the first clustered data to produce second clustered data that indicates a plurality of states describing behavior of the aircraft operating over the training legs and applies a third clustering algorithm to identify one or more fault states of the aircraft from the plurality of states based on the training data and the second clustered data. The apparatus receives messages carrying data from the aircraft over a digital datalink, detects a fault state of the one or more fault states from the data, and generates an alert of the fault state.

24 Claims, 10 Drawing Sheets

(56) References Cited

U.S. PATENT DOCUMENTS

| | | | | |
|---|---|---|---|---|
| 2010/0161244 | A1* | 6/2010 | Ghoshal | G01N 29/14 702/35 |
| 2013/0274989 | A1* | 10/2013 | Isom | B64F 5/60 701/31.4 |
| 2016/0104329 | A1* | 4/2016 | Sundareswara | G07C 5/0816 701/33.9 |
| 2016/0107765 | A1* | 4/2016 | Dani | G07C 5/008 701/29.1 |
| 2016/0125053 | A1* | 5/2016 | Willson | G06F 16/211 707/746 |
| 2016/0188675 | A1* | 6/2016 | Vossler | G06F 16/242 707/776 |
| 2018/0108261 | A1* | 4/2018 | Zajac | G06F 7/00 |
| 2018/0307784 | A1* | 10/2018 | Stevens | G07C 5/0808 |
| 2019/0096145 | A1* | 3/2019 | Sundareswara | G06N 20/00 |
| 2019/0277155 | A1* | 9/2019 | Dowdell | B64D 45/00 |
| 2019/0294726 | A1* | 9/2019 | Santoso | G06Q 50/30 |

OTHER PUBLICATIONS

Byington, Carl S., et al., "Dynamic Signal Analysis and Neural Network Modeling for Life Prediction of Flight Control Actuators," American Helicopter Society 60th Annual Forum, Baltimore, Maryland, Jun. 7-10, 2004, 10 pages.

Lo, Chet, et al., "Noise-Domain Reflectometry for Locating Wiring Faults," IEEE Transactions on Electromagnetic Compatibility, vol. 47, No. 1, Feb. 2005, pp. 97-104.

Ghidella, Jason, et al., "Requirements-Based Testing in Aircraft Control Design," American Institute of Aeronautics and Astronautics Modeling and Simulations Technologies Conference and Exhibit 2005, Aug. 15-18, 2005, San Francisco, California, 11 pages.

Kobayashi, Takahisa, et al., "Application of a Bank of Kalman Filters for Aircraft Engine Fault Diagnostics," Turbo Expo 2003, Atlanta, Georgia, Jun. 16-19, 2003, 15 pages.

Ester, Martin, et al., "A Density-Based Algorithm for Discover Clusters in Large Spatial Databases with Noise," Proceedings of the Second International Conference on Knowledge Discovery and Data Mining (KDD-96), AAAI Press, 1996, pp. 226-231.

Rasmussen, Carl Edward, "The Infinite Gaussian Mixture Model," Advances in Neural Information Processing Systems, vol. 12, MIT Press, 2000, pp. 554-560.

Smith, Paul, et al., "Analysis of Spread Spectrum Time Domain Reflectometry for Wire Fault Location," IEEE Sensors Journal, vol. 5, No. 6, Dec. 2005, pp. 1469-1478.

Volponi, Allan J., et al., "Development of an Information Fusion System for Engine Diagnostics and Health Management," 39th Combustion/27th Airbreathing Propulsion/21st Propulsion Systems Hazards/3rd Modeling and Simulation Joint Subcommittee Meeting, Colorado Springs, Colorado, Dec. 1-5, 2003, 22 pages.

Yan, Weizhong, et al., "Jet Engine Gas Path Fault Diagnosis Using Dynamic Fusion of Multiple Classifiers," 2008 IEEE International Joint Conference on Neural Networks (IEEE World Congress on Computational Intelligence), Hong Kong, Jun. 1-8, 2008, pp. 1585-1591.

* cited by examiner

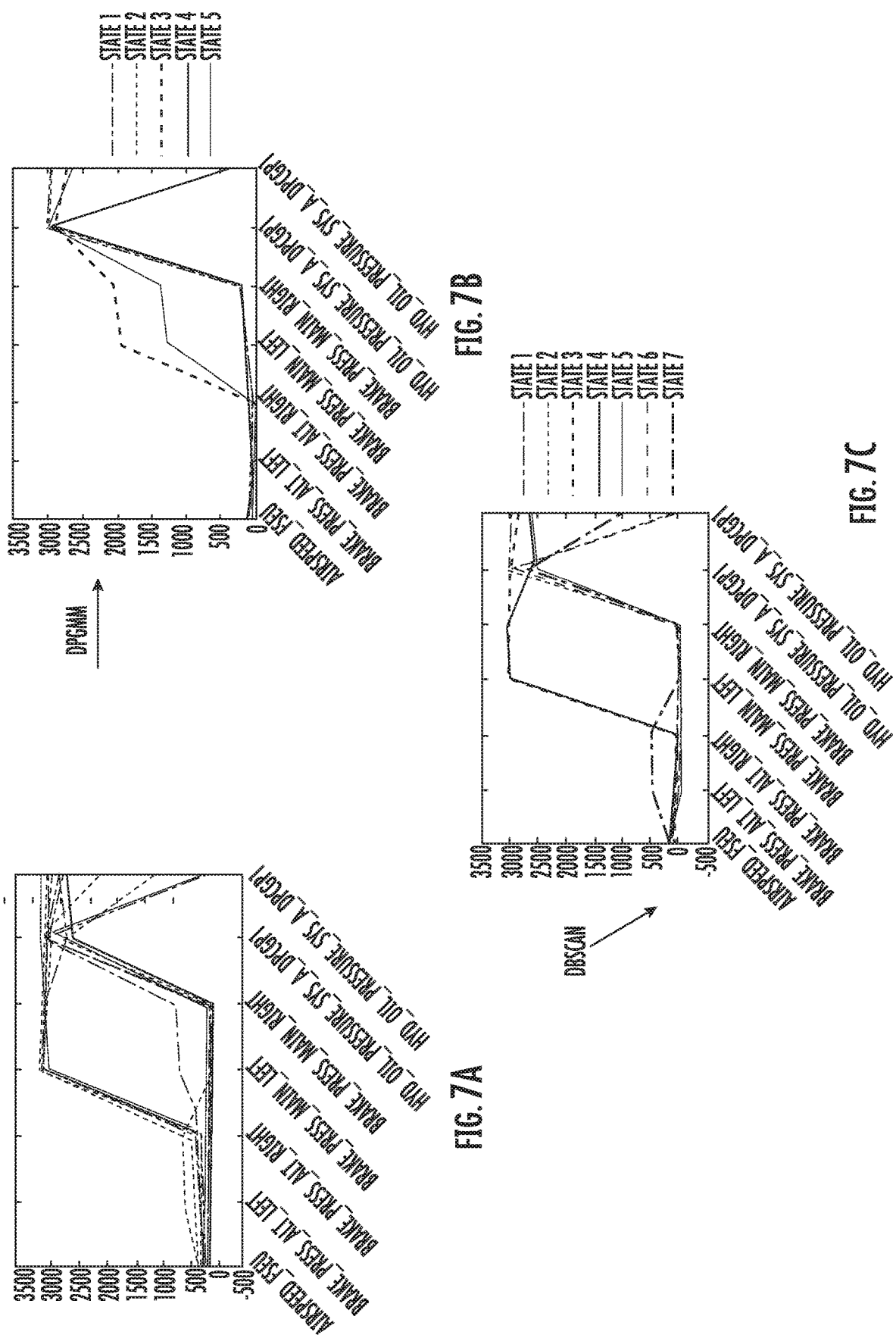

DETECTING FAULT STATES OF AN AIRCRAFT

TECHNOLOGICAL FIELD

The present disclosure relates generally to detecting fault states of an aircraft, and in particular, to detecting fault states of an aircraft using clustering algorithms.

BACKGROUND

Detecting fault states of an aircraft is important for operation and maintenance of the aircraft. Conventionally, detecting fault states of an aircraft is performed "off-line," e.g., after the aircraft has landed, which does not provide real-time detection. One conventional approach to detect fault states of an aircraft is a model-based approach. The model-based approach can provide the physical model of the system and the expected values in normal operating conditions. An alert is generated if sensor readings deviate from the expected values. A disadvantage of the model-based approach is that a user has to monitor many channels (or their derived features) or some combination of channels (or derived features) which may be prohibitively expensive. In addition, when the system undergoes a change or an upgrade such that new components are added, new models have to be derived. Another conventional approach uses time-domain reflectometry which involves the propagation of a step energy or a spread spectrum signal function into the system. This approach requires subsequent statistical analysis of the returned signal's magnitude, shape and duration to detect the presence of a fault, which may be complicated.

Therefore, it would be desirable to have a system and method that takes into account at least some of the issues discussed above, as well as other possible issues.

BRIEF SUMMARY

Example implementations of the present disclosure are directed to detecting fault states of an aircraft using clustering algorithms, and in real-time during operation of the aircraft, e.g., during flight. Example implementations provide a model-free approach such that detecting fault states of an aircraft can be performed based on data from the aircraft alone without the need for a new model. Also, example implementations are able to detect fault states and flight legs experiencing fault states with a high probability.

The present disclosure thus includes, without limitation, the following example implementations.

Some example implementations provide an apparatus for detecting fault states of an aircraft, the apparatus comprising a processor and a memory storing executable instructions that, in response to execution by the processor, cause the apparatus to at least: receive training data including operational parameters of an aircraft operating over a plurality of training flight legs; apply a first clustering algorithm separately to the training data for each of the plurality of training flight legs to produce first clustered data, the first clustering algorithm being configured to cluster the operational parameters into one or more respective clusters for each of the plurality of training flight legs; apply a second clustering algorithm to the first clustered data to produce second clustered data that indicates a plurality of states describing behavior of the aircraft operating over the plurality of training flight legs; apply a third clustering algorithm to the second clustered data to identify one or more fault states of the aircraft from the plurality of states based on the training data and the second clustered data; establish a digital datalink with the aircraft; receive messages carrying data from the aircraft over the digital datalink; detect a fault state of the one or more fault states from the data; and in response, generate an alert.

In some example implementations of the apparatus of any preceding example implementation, or any combination of preceding example implementations, wherein the apparatus being caused to apply the third clustering algorithm includes being caused to: identify each of the plurality of training flight legs as a first type of flight leg in which the training data describes the aircraft in a first set of the plurality of states, or a second type of flight leg in which the training data describes the aircraft in a second set of the plurality of states, based on the training data and the second clustered data; and identify the one or more fault states of the aircraft from the plurality of states based on a difference in states between the first set of the plurality of states of the first type of flight leg and the second set of the plurality of states of the second type of flight leg.

In some example implementations of the apparatus of any preceding example implementation, or any combination of preceding example implementations, wherein the apparatus being caused to apply the first clustering algorithm includes being caused to apply the first clustering algorithm separately to the training data of each of a plurality of flight phases for each of the plurality of training flight legs.

In some example implementations of the apparatus of any preceding example implementation, or any combination of preceding example implementations, wherein the apparatus being caused to apply the second clustering algorithm includes being caused to produce a library including the second clustered data that indicates the plurality of states, and the apparatus being caused to apply the third clustering algorithm includes being caused to identify the one or more fault states based on the training data and the library.

In some example implementations of the apparatus of any preceding example implementation, or any combination of preceding example implementations, wherein the apparatus being caused to apply the first clustering algorithm includes being caused to apply a Dirichlet Process Gaussian Mixture Model (DPGMM), and the apparatus being caused to apply the second clustering algorithm includes being caused to apply a DPGMM or a Density Based Spatial Clustering of Applications with Noise (DBSCAN).

In some example implementations of the apparatus of any preceding example implementation, or any combination of preceding example implementations, wherein the apparatus being caused to apply the second clustering algorithm includes being caused to assign the training data for each of a plurality of points in time for each of the plurality of training flight legs separately to one of the plurality of states.

In some example implementations of the apparatus of any preceding example implementation, or any combination of preceding example implementations, wherein the apparatus being caused to detect the fault state includes being caused to at least: assign the data for each of a plurality of points in time separately to one of the plurality of states; and detect that the data for one of the plurality of points in time is assigned to the fault state.

In some example implementations of the apparatus of any preceding example implementation, or any combination of preceding example implementations, wherein the apparatus being caused to apply the third clustering algorithm includes being caused to apply the third clustering algorithm to a histogram of the second clustered data for each of the plurality of training flight legs.

Some example implementations provide a method of detecting fault states of an aircraft, the method comprising: receiving training data including operational parameters of an aircraft operating over a plurality of training flight legs; applying a first clustering algorithm separately to the training data for each of the plurality of training flight legs to produce first clustered data, the first clustering algorithm being configured to cluster the operational parameters into one or more respective clusters for each of the plurality of training flight legs; applying a second clustering algorithm to the first clustered data to produce second clustered data that indicates a plurality of states describing behavior of the aircraft operating over the plurality of training flight legs; applying a third clustering algorithm to the second clustered data to identify one or more fault states of the aircraft from the plurality of states based on the training data and the second clustered data; establishing a digital datalink with the aircraft; receiving messages carrying data from the aircraft over the digital datalink; detecting a fault state of the one or more fault states from the data; and in response, generating an alert.

Some example implementations provide a computer-readable storage medium for detecting fault states of an aircraft, the computer-readable storage medium being non-transitory and having computer-readable program code stored therein that in response to execution by a processor, causes an apparatus to at least: receive training data including operational parameters of an aircraft operating over a plurality of training flight legs; apply a first clustering algorithm separately to the training data for each of the plurality of training flight legs to produce first clustered data, the first clustering algorithm being configured to cluster the operational parameters into one or more respective clusters for each of the plurality of training flight legs; apply a second clustering algorithm to the first clustered data to produce second clustered data that indicates a plurality of states describing behavior of the aircraft operating over the plurality of training flight legs; apply a third clustering algorithm to the second clustered data to identify one or more fault states of the aircraft from the plurality of states based on the training data and the second clustered data; establish a digital datalink with the aircraft; receive messages carrying data from the aircraft over the digital datalink; detect a fault state of the one or more fault states from the data; and in response, generate an alert.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

Figures 6A, 6B:
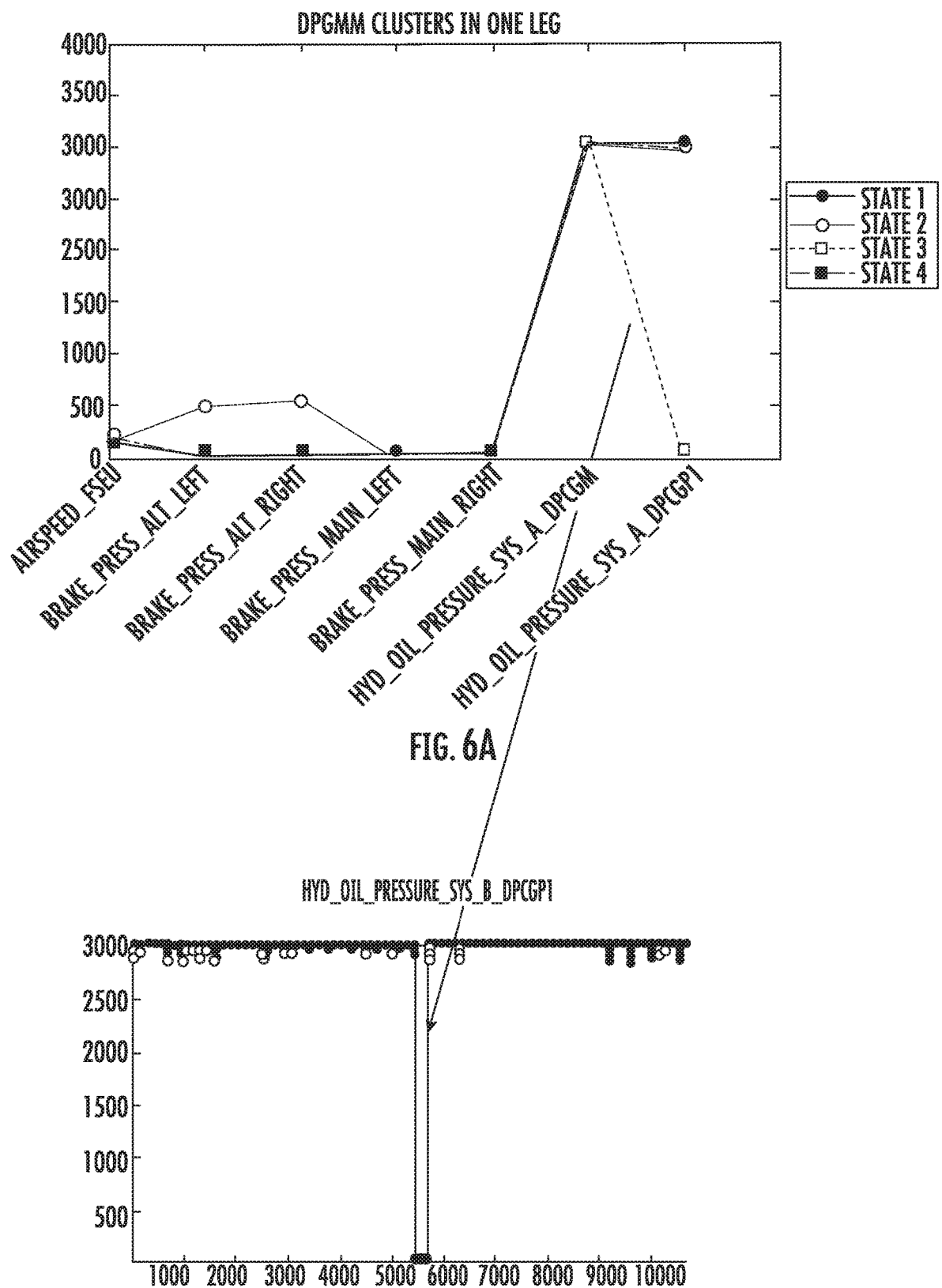
Figure 8A:
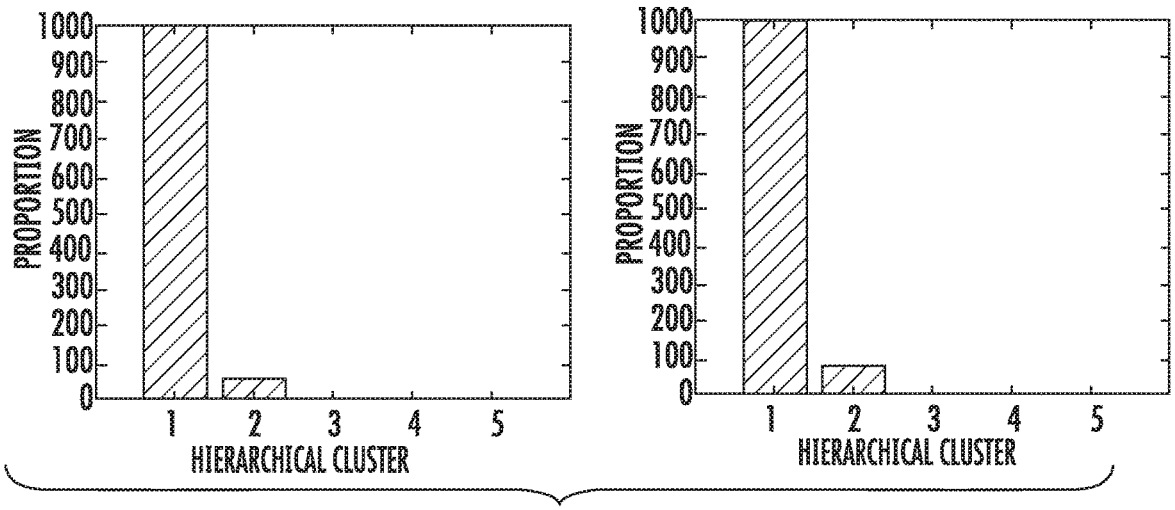
Figure 8B:
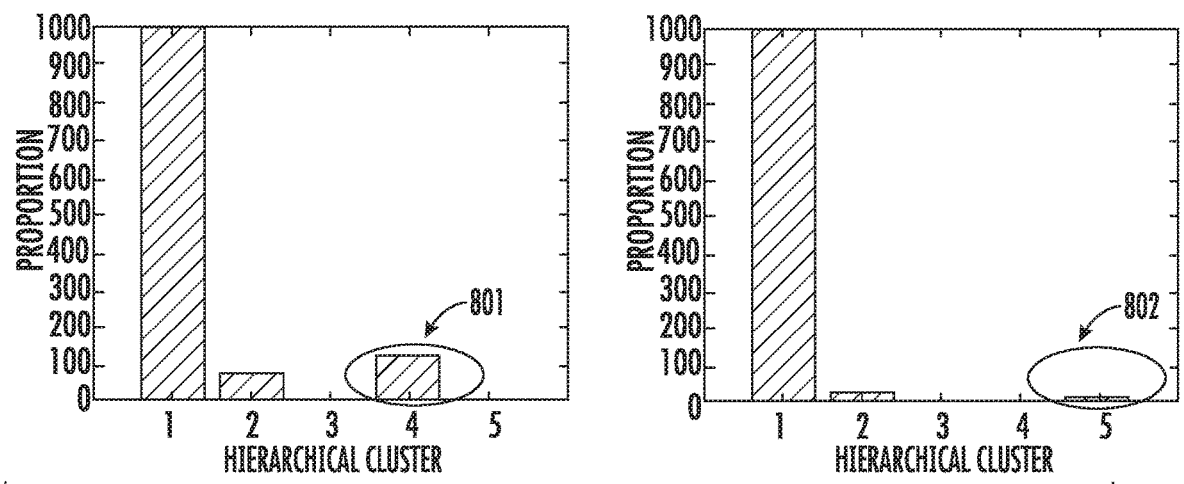
Figure 9:
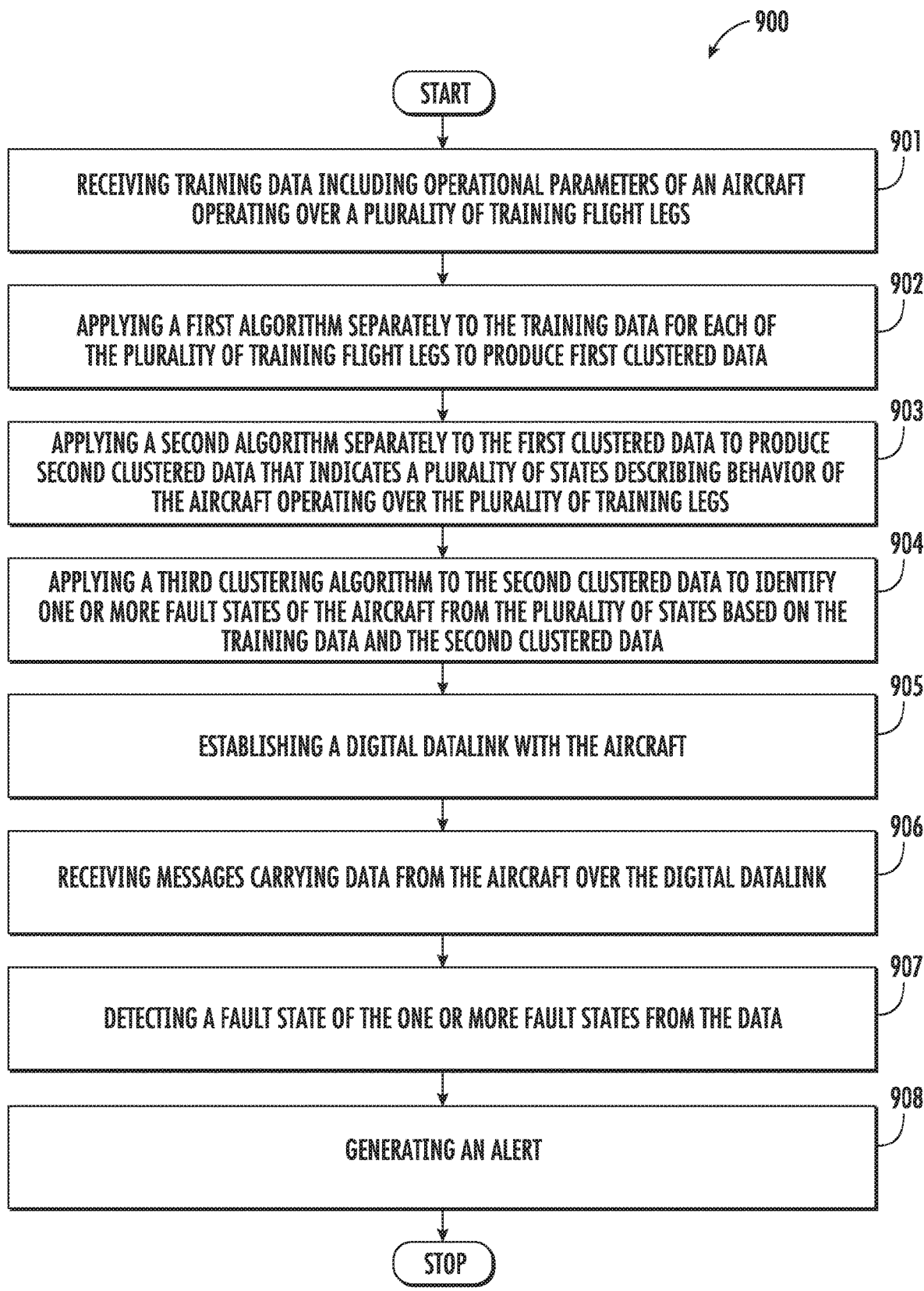
Figure 10:
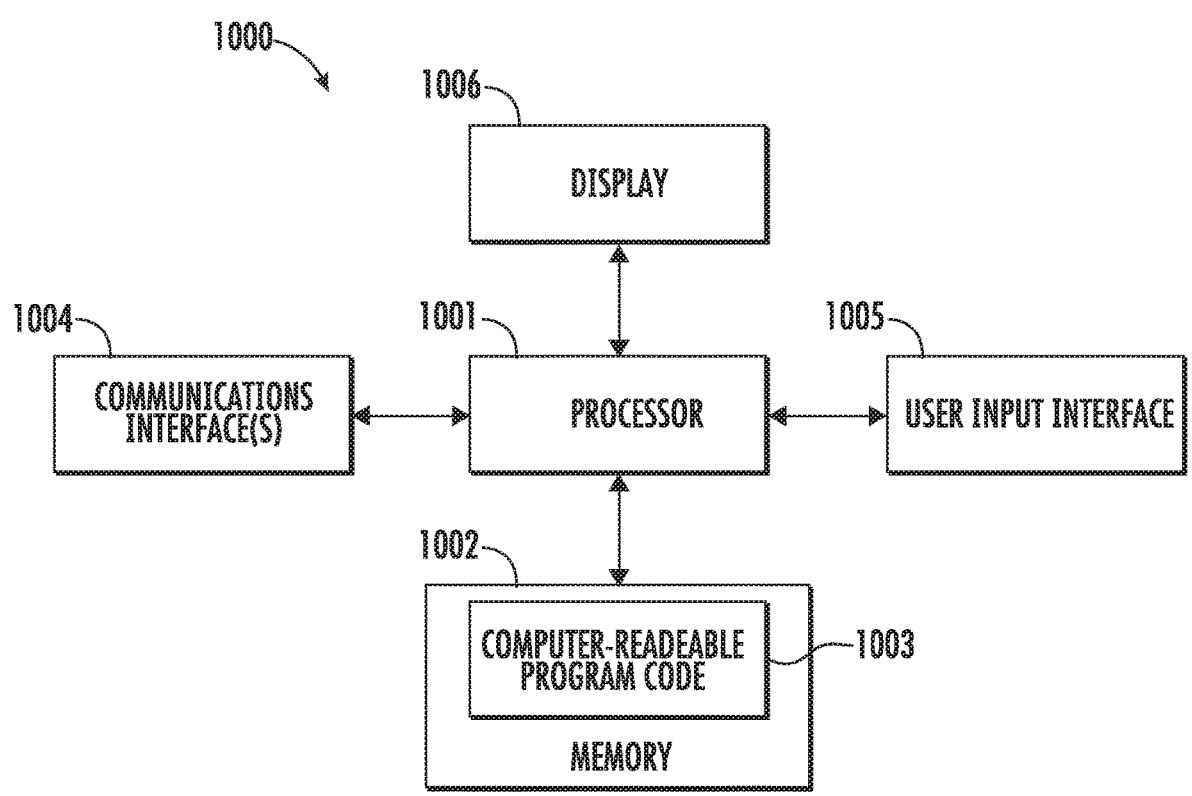

FIG. 6(a) and FIG. 6(b) illustrate a first-level clustering, according to various example implementations;

FIG. 7(a), FIG. 7(b) and FIG. 7(c) illustrate a second-level clustering, according to various example implementations;

FIG. 8(a) and FIG. 8(b) illustrate histograms used to identify one or more fault states of an aircraft from a plurality of states, according to various example implementations;

FIG. 9 is a flowchart illustrating various operations in a method of detecting fault states of an aircraft, according to various example implementations; and FIG. 10 illustrates an apparatus according to some example implementations;

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to detecting fault states of an aircraft, and in particular, to detecting fault states of an aircraft using clustering algorithms.

Figure 1:
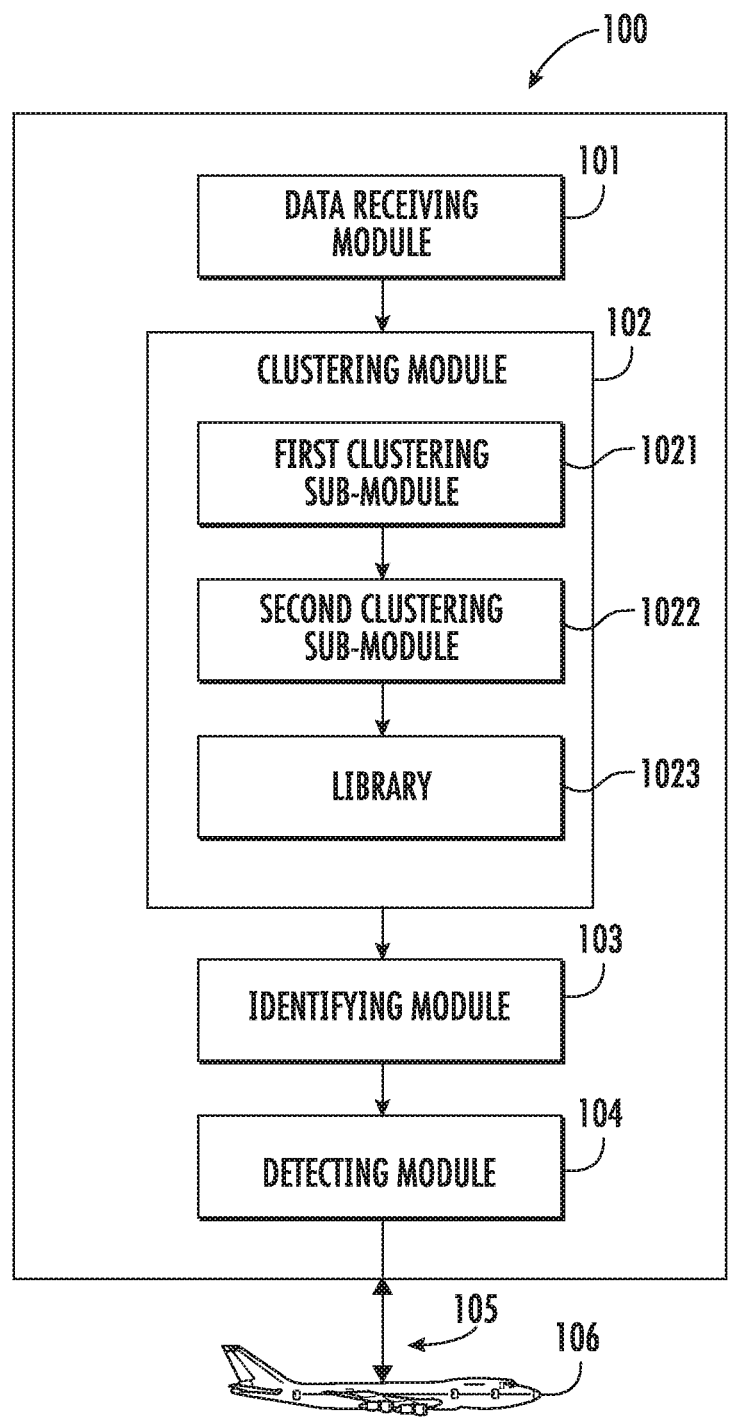
FIG. 1 illustrates an apparatus for detecting fault states of an aircraft, according to various example implementations.

FIG. 1 illustrates a system 100 for detecting fault states of an aircraft 106, according to example implementations of the present disclosure. The system 100 will be primarily described as being off-board but in communication with the aircraft 106, although in some examples, the system 100 may instead be onboard the aircraft 106. In some examples, as described in greater detail with reference to FIG. 10, the system may be implemented by an apparatus that includes a processor and a memory storing executable instructions.

The system 100 includes any of a number of different subsystems (each an individual system) for performing one or more functions or operations. As shown, in some examples, the system 100 includes one or more of each of a data receiving module 101, a clustering module 102, an identifying module 103 and a detecting module 104. The subsystems may be co-located or directly coupled to one another, or in some examples, various ones of the subsystems may communicate with one another across one or more computer networks. Further, although shown as part of the system 100, it should be understood that any one or more of the data receiving module 101, clustering module 102, identifying module 103 or detecting module 104 may function or operate as a separate system without regard to any of the other subsystems. It should also be understood that the system 100 may include one or more additional or alternative subsystems than those shown in FIG. 1.

In some examples, the data receiving module 101 is configured to receive training data including operational parameters of the aircraft 106 operating over a plurality of training flight legs. The operational parameters may include parameters of the aircraft 106 during the training flight legs, e.g., the hydraulic oil pressure of the aircraft 106 during the training flight legs. In one example, the data receiving module 101 may be configured to receive the training data via respective communication interfaces of the system 100 and the aircraft 106.

The received training data can be sent to the clustering module 102 of the system 100. A multi-level clustering process can be used to generate clustered data for detecting fault states of the aircraft 106. In some examples, the clustering module 102 is configured to apply a first clustering algorithm separately to the training data for each of the plurality of training flight legs to produce first clustered data through a first clustering sub-module 1021 of the clustering module 102. In some examples, the first clustering algorithm is configured to cluster the operational parameters into one or more respective clusters for each of the plurality of training flight legs. In some examples, the first clustering sub-module 1021 is configured to apply the first clustering algorithm separately to the training data of each of a plurality of flight phases for each of the plurality of training flight legs. In one example, the flight phases may include at least taking off, in-flight and landing. In some examples, the first clustering sub-module 1021 is configured to apply a Dirichlet Process Gaussian Mixture Model (DPGMM) as the first clustering algorithm.

In some examples, the clustering module 102 is configured to apply a second clustering algorithm to the first clustered data to produce second clustered data through a second clustering sub-module 1022 of the clustering module 102. In these examples, the second clustered data indicates a plurality of states describing behavior of the aircraft 106 operating over the plurality of training legs. In some examples, the second clustering sub-module 1022 is configured to produce a library 1023 (e.g., a latent state or fault signature library) including the second clustered data that indicates the plurality of states. In one example, the library 1023 can be included in the clustering module 102. In some examples, the second clustering sub-module 1022 is configured to apply a DPGMM or a Density Based Spatial Clustering of Applications with Noise (DBSCAN) as the second clustering algorithm.

After the second clustered data is produced by the clustering module 102, in some examples, the identifying module 103 is configured to apply a third clustering algorithm to the second clustered data to identify one or more fault states of the aircraft 106 from the plurality of states based on the training data and the second clustered data. In one example, the third clustering algorithm can be a DPGMM or the same clustering algorithm as the first or the second clustering algorithms. Other clustering algorithms may also be used in the multi-level clustering process. In some examples, the identifying module 103 is configured to apply the third clustering algorithm to a histogram of the second clustered data for each of the plurality of training flight legs. One example of the histogram is shown in FIG. 8(a) and FIG. 8(b) below.

In some examples, the identifying module 103 is configured to identify each of the plurality of training flight legs as a first type of flight leg in which the training data describes the aircraft 106 in a first set of the plurality of states, or a second type of flight leg in which the training data describes the aircraft 106 in a second set of the plurality of states, based on the training data and the second clustered data. The identifying module 103 is configured to identify the one or more fault states of the aircraft 106 from the plurality of states based on a difference in states between the first set of the plurality of states of the first type of flight leg and the second set of the plurality of states of the second type of flight leg.

In some examples, the identifying module 103 is configured to identify the one or more fault states based on the training data and the library 1023 including the second clustered data. In some examples, the identifying module 103 is configured to assign the training data for each of a plurality of points in time for each of the plurality of training flight legs separately to one of the plurality of states. In one example, each point in time may be one second or other values.

In one example, the training process is finished after identifying the one or more fault states. The identified one or more fault states of the plurality of states can be sent to the detecting module 104 of the system 100. In some examples, the data receiving module 101 is configured to establish a digital datalink 105 with the aircraft 106 and receive messages carrying data from the aircraft 106 over the digital datalink 105. In these examples, the detecting module 104 is configured to detect a fault state of the one or more fault states from the data; and in response, generate an alert. In some examples, the detecting module 104 is configured to assign the data for each of a plurality of points in time separately to one of the plurality of states, and detect that the data for one of the plurality of points in time is assigned to the fault state. In one example, each point in time may be one second or other values.

Figure 2:
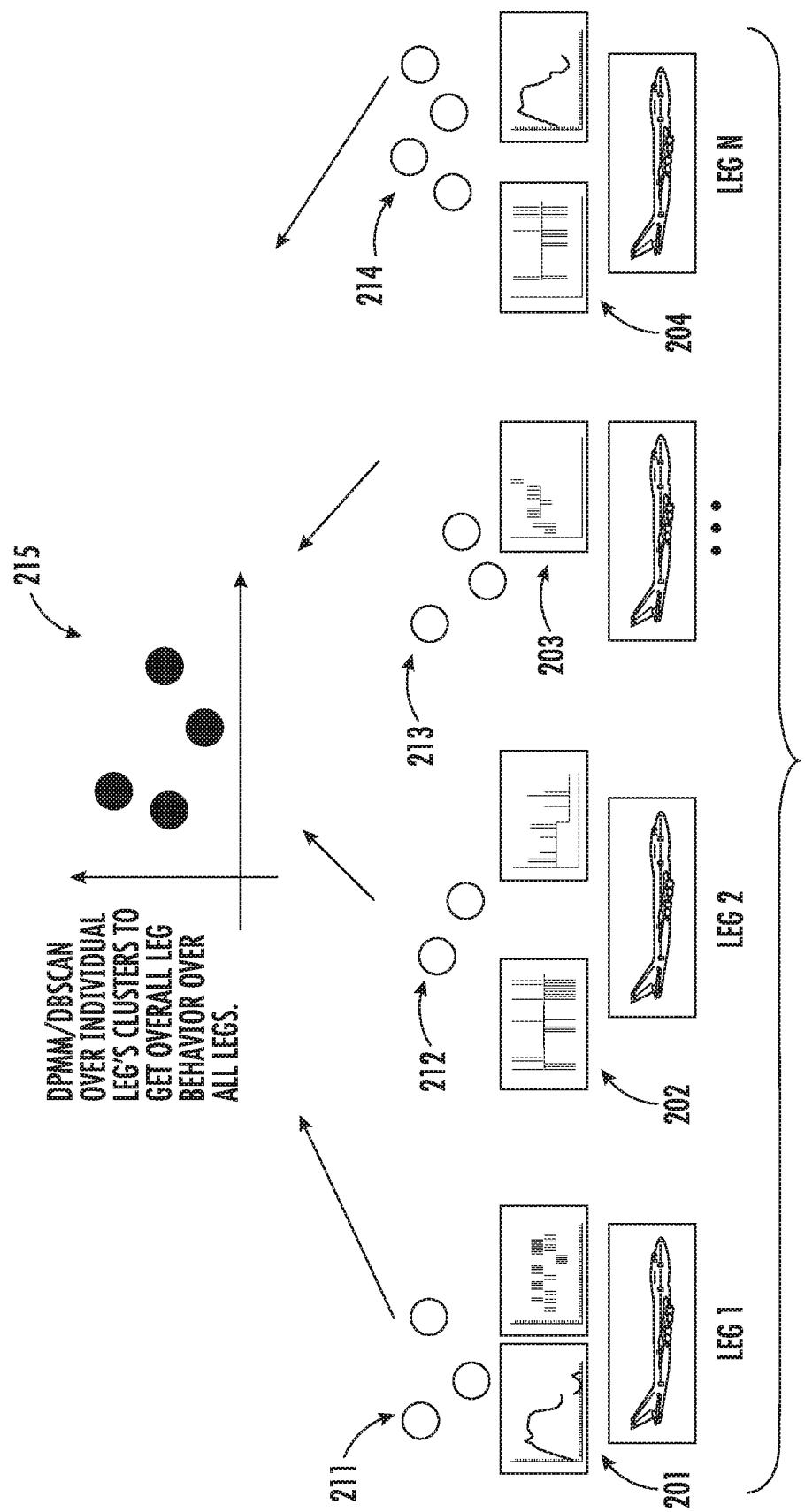
FIG. 2 illustrates a multi-level clustering process according to various example implementations.

FIG. 2 illustrates a multi-level clustering process according to which the clustering module 102 of the system 100 may apply the first and second clustering algorithms, according to example implementations of the present disclosure. As shown, in some examples, in the first-level clustering process, the system 100 is configured to apply a first clustering algorithm (e.g., a DPGMM) separately to the training data for each of the plurality of training flight legs (e.g., leg 1-leg n) to produce first clustered data. The first clustering algorithm is configured to cluster the operational parameters 201-204 into one or more respective clusters 211-214 for each of the plurality of training flight legs. The first clustered data may include the clusters 211-214.

In the second-level clustering process, in some examples, the system 100 is configured to apply a second clustering algorithm (e.g., a DPGMM or a DBSCAN) to the first clustered data (clusters 211-214) to produce second clustered data 215. The second clustered data indicates a plurality of states (or clusters) describing behavior of the aircraft 106 operating over the plurality of training legs. With the multi-level clustering process, the chance of every anomalous or fault state in any leg being represented can be high.

Figure 3:
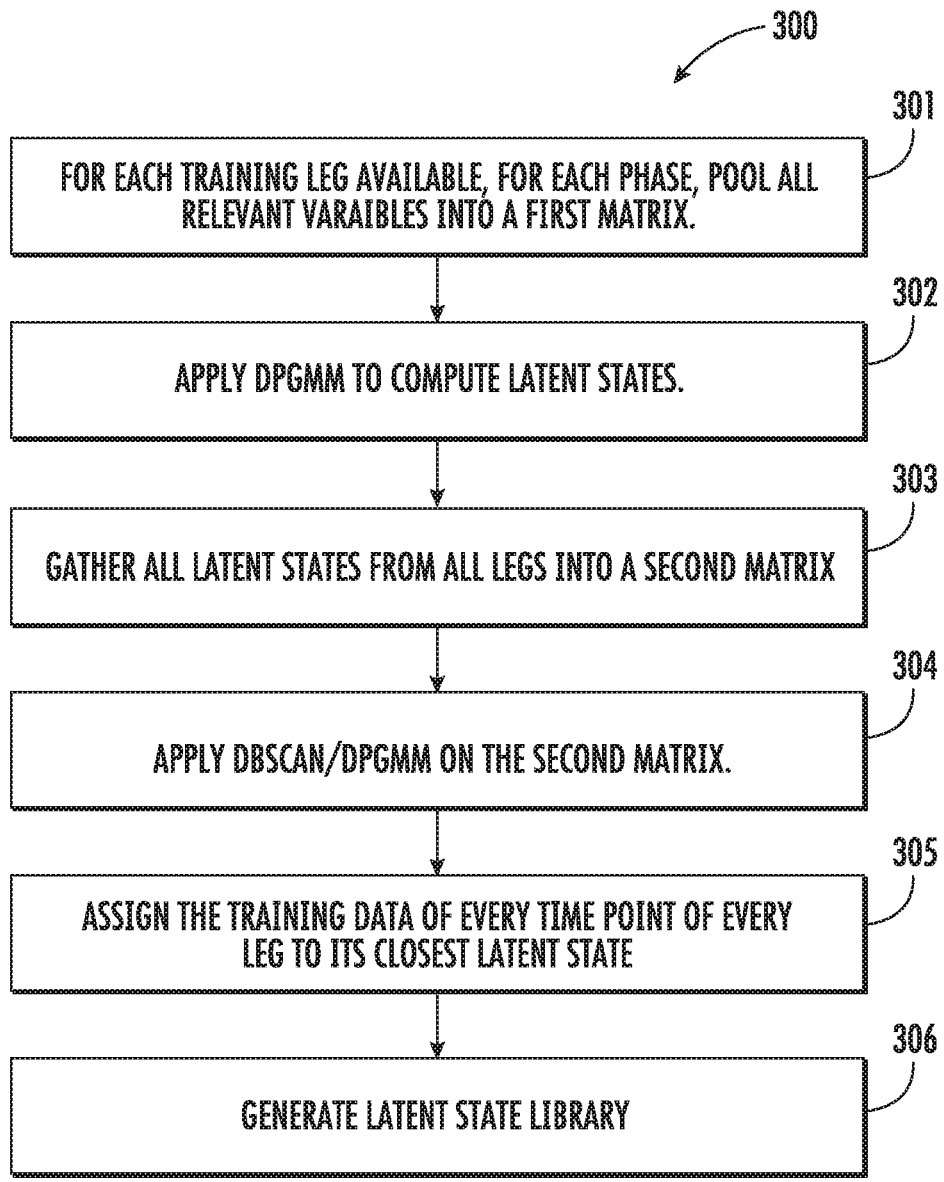
FIG. 3 is a flowchart illustrating various operations in a training algorithm for generating a latent state library, according to various example implementations.

FIG. 3 is a flowchart illustrating various operations in a training algorithm 300 for generating the library 1023 by the clustering module 102 of the system 100, according to various example implementations. As shown at block 301, for each available training leg of the aircraft 106, for each flight phase, the data receiving module 101 is configured to pool all relevant variables into a first matrix. In one example, the input to the system 100 may be the subject matter expert (SME) identified variables. The relevant variables may include the operational parameters 201-204. In another example, the rows of the first matrix may include points in time and columns of the first matrix may include the relevant variables. In this example, the first matrix can be a time-series matrix.

At block 302, the first clustering sub-module 1021 is configured to apply DPGMM to the first matrix to compute latent states. In one example, block 302 corresponds to the first-level clustering process, as explained above. The computed latent states can be the clusters 211-214. At block 303, the system 100 is configured to gather all latent states from all legs computed at block 302 into a second matrix.

At block 304, the second clustering sub-module 1022 is configured to apply either DPGMM or DBSCAN on the second matrix to generate a plurality of hierarchical latent states describing behavior of the aircraft 106 operating over the plurality of training legs. In one example, block 304 corresponds to the second-level clustering process, as explained above. In one example, the user can choose the clustering algorithm to be used at block 304. If the user is aware that the data may contain several anomalies, then the user may choose to use DBSCAN. Otherwise, if the user is not knowledgeable about the data, then the user may choose to use DPGMM.

At block 305, the second clustering sub-module 1022 is configured to assign the training data of every time point in every leg to the closest hierarchical latent state computed at block 304. In one example, the multiple hierarchical latent states computed at block 304 may be included in the second clustered data 215. In one example, the second clustering sub-module 1022 may be configured to assign the training data to the closest hierarchical latent state based on the Euclidean distance between the training data and a mean value of the hierarchical latent state.

At block 306, the hierarchical latent states (described in FIG. 7(a), FIG. 7(b) and FIG. 7(c) below) can be used to generate the library 1023 by the second clustering sub-module 1022. In one example, each of the multiple hierarchical latent states can be a data "signature." Not all of the hierarchical latent states are faulty (the majority of them may be normal). However, it is desired to generate a complete representation of all operational states in the library.

In one example, each of the anomalies or fault states can be preserved in the library 1023 based on the multi-level clustering process. One advantage of the multi-level clustering process is that when there is new data to train on, a user only needs to implement the system 100 to compute latent states for the new training leg and re-run the second-level clustering process, which takes much less time because the second-level clustering process is not performed on hundreds of the training legs, each over hundreds of time-series.

Figure 4:
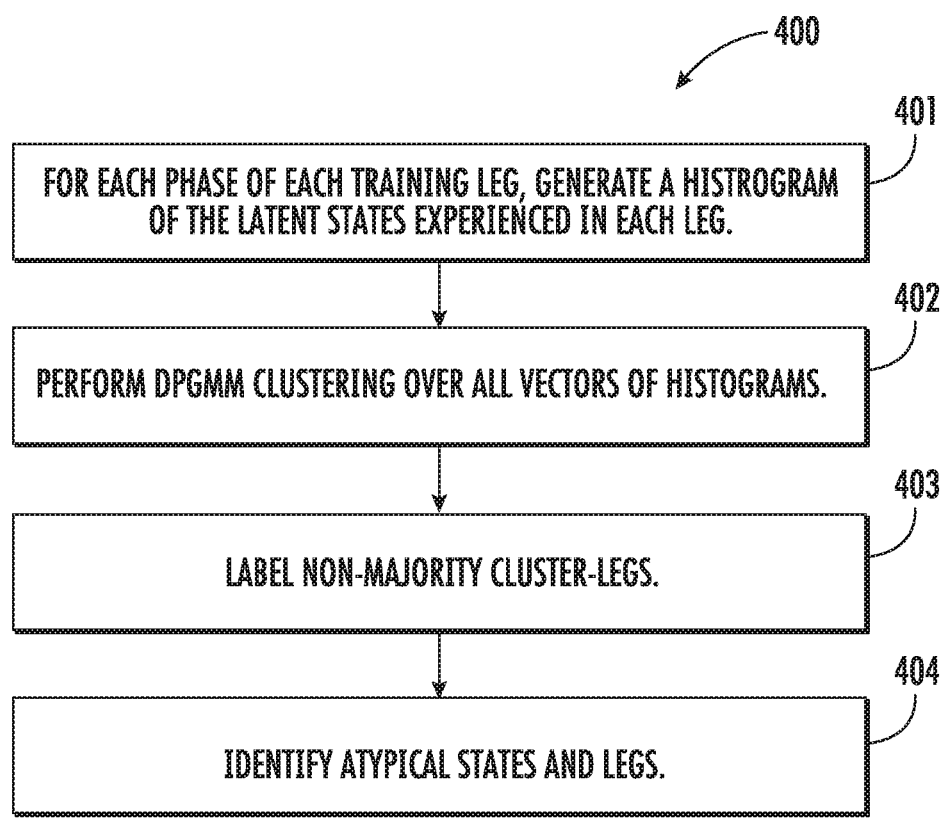
FIG. 4 is a flowchart illustrating various operations in a training algorithm for identifying one or more fault states of an aircraft, according to various example implementations.

FIG. 4 is a flowchart illustrating various operations in a training algorithm 400 for identifying one or more fault states of the aircraft 106 by the identifying module 103 of the system 100, according to various example implementations. As shown, at block 401, for each flight phase of each training leg, the identifying module 103 is configured to generate a histogram of the latent states experienced in each leg (described in FIG. 8(a) and FIG. 8(b) below). In one example, each histogram may include a vector indicating the number of latent states (normal and faulty) experienced in a corresponding training leg. In one example, the latent states are included in the fault signature library described above.

At block 402, the identifying module 103 is configured to apply a third clustering algorithm (e.g., DPGMM) over all vectors of all the histograms. At block 403, the identifying module 103 is configured to label or identify non-majority cluster legs. In one example, the identifying module 103 is configured to label the majority cluster legs as normal legs and each cluster or state in the majority-cluster legs as normal states. At block 404, the identifying module 103 is configured to identify fault or atypical states and legs. In one example, for each non-majority cluster leg, the identifying module 103 is configured to label the non-majority states that are not in common with any states in the normal legs as "atypical states" or "fault states." The identifying module 103 may be also configured to label the legs with fault states as "atypical legs."

In some examples, at block 403, the identifying module 103 is configured to identify each of the plurality of training flight legs as a first type of flight leg in which the training data describes the aircraft 106 in a first set of the plurality of states, or a second type of flight leg in which the training data describes the aircraft 106 in a second set of the plurality of states, based on the training data and the second clustered data 215. In some examples, at block 404, the identifying module 103 is configured to identify the one or more fault states of the aircraft 106 from the plurality of states based on a difference in states between the first set of the plurality of states of the first type of flight leg and the second set of the plurality of states of the second type of flight leg. In one example, the training algorithms described in FIG. 3 and FIG. 4 are implemented off-board the aircraft. In this example, during the flying time in the training legs, the aircraft 106 may stream down the training data to a ground station where the training algorithms are implemented.

Figure 5:
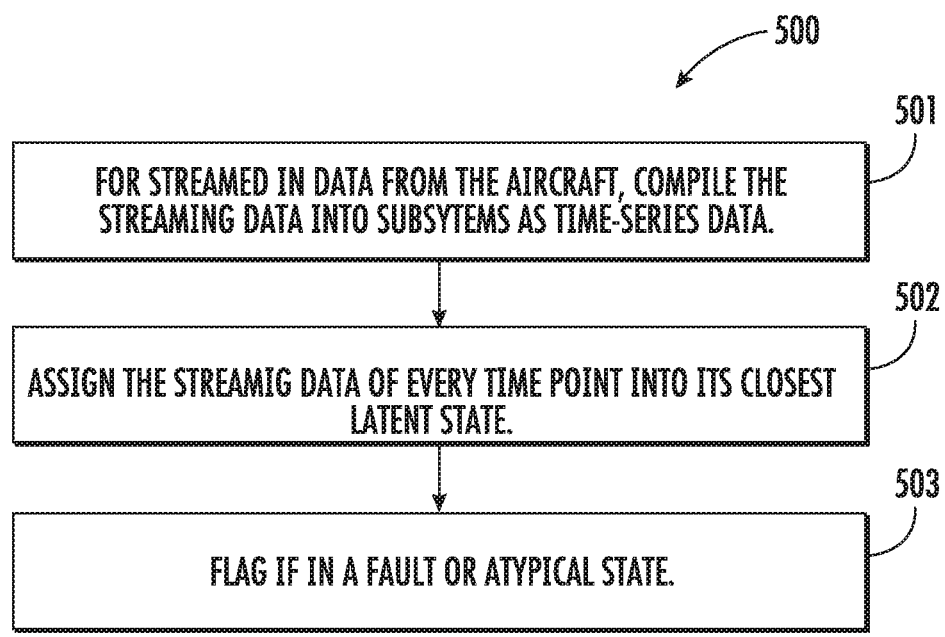
FIG. 5 is a flowchart illustrating various operations in a method of detecting fault states of an aircraft based on streaming data from the aircraft, according to various example implementations.

FIG. 5 is a flowchart illustrating various operations in a method 500 of detecting fault states of the aircraft 106 based on streaming data from the aircraft by the detecting module 104 of the system 100, according to various example implementations. As shown, at block 501, for data streamed in from the aircraft 106, the detecting module 104 is configured to compile the streaming data into subsystems as time-series data. In one example, the detecting module 104 is configured to separate the streaming data into the same resolution as the training data. If the streamed-in resolution is coarser than the training data, then the detecting module 104 is configured to perform linear interpolation. If the streamed-in resolution is higher than the training data, then the detecting module 104 is configured to only use the needed resolution. In one example, the data receiving module 101 is configured to receive the streaming data from the aircraft 106 through the digital datalink 105 established between the system 100 and the aircraft 106. In one example, when detecting the fault states, the system 100 is onboard the aircraft 106. In at least this example, the digital datalink 105 may not be needed to receive the streaming data.

At block 502, the detecting module 104 is configured to assign the received streaming data of every point in time separately to its closest latent state. In one example, the operation at block 502 is similar to the operation at block 305 in the training process as explained above. At block 503, the detecting module 104 is configured to flag if the streaming data of any point of time is assigned to one of the fault or atypical states identified as described in FIG. 4 above. In some examples, the detecting module 104 is configured to detect that the data for one of the plurality of points in time is assigned to a fault or atypical state.

FIG. 6(a) and FIG. 6(b) illustrate the first-level clustering over one training leg, according to various example implementations. FIG. 6(a) illustrates the results of applying DPGMM to a flight phase of a training leg (the first-level clustering at block 302) of the aircraft 106. As shown, the X-axis indicates the variables or operational parameters and the Y-axis indicates values of the variables or operational parameters. After applying DPGMM to the training data in the flight phase of the training leg, the operational parameters are clustered into one or more respective clusters or states. In one example, each curve shown in FIG. 6(a) indicates a state and there are four states (e.g., state 1-state 4) that are resulted from the training leg after the first-level clustering. Each curve shown represents the state of the aircraft in the flight phase or any point of time in the flight phase.

In the example shown in FIG. 6(a), states 1, 2 and 4 are normal operational states and state 3 is a fault or atypical operational state in the training leg. In FIG. 6(a), state 3 corresponds to the hydraulic oil pressure of the training leg. As shown in FIG. 6(a), in state 3, the value of the hydraulic oil pressure drops from about 3000 to 0, which may indicate a fault or atypical operational state of the aircraft 106. FIG. 6(b) illustrates time series of the value of the hydraulic oil pressure in the flight phase of the training leg. FIG. 6(b) indicates the drop of the value of the hydraulic oil pressure from about 3000 to 0, which corresponds to state 3 in FIG. 6(a).

FIG. 7(a), FIG. 7(b) and FIG. 7(c) illustrate the second-level clustering over the plurality of training legs, according to various example implementations. FIG. 7(a) illustrates all the computed states from all of the plurality of training legs after the first-level clustering. In one example, the first-level clustering at block 302 is implemented multiple times separately to the training data of each of a plurality of flight phases for each of the plurality of training flight legs.

FIG. 7(b) illustrates an example of applying DPGMM to all the states from all the training legs shown in FIG. 7(a). The example shown in FIG. 7(b) corresponds to the second-level clustering at block 304. After the second-level clustering, FIG. 7(b) indicates five (5) hierarchical latent states (i.e., the second clustered data 215). Similarly, FIG. 7(c) illustrates an example of applying DBSCAN to all the states from all the training legs shown in FIG. 7(a). The example shown in FIG. 7(c) also corresponds to the second-level clustering at block 304. After the second-level clustering, FIG. 7(c) indicates 7 hierarchical latent states (i.e., the second clustered data 215).

In one example, the system 100 can use the hierarchical latent states shown in FIG. 7(b) or FIG. 7(c) to generate the latent state library at block 306. One advantage of the hierarchical multi-level clustering is that the multi-level clustering can cover all anomalous or fault states with a high probability as compared to pooling all the data from all legs and using only one level of clustering.

FIG. 8(a) and FIG. 8(b) illustrate histograms used to identify one or more fault states of the aircraft 106 from the plurality of states, according to various example implementations. FIG. 8(a) and FIG. 8(b) illustrate examples of typical training legs and atypical training legs using the result of the five hierarchical states computed by DPGMM as shown in FIG. 7(b). FIG. 8(a) illustrates the histogram vectors of the majority cluster legs. As shown in FIG. 8(a), data (or most of the data) from the majority cluster legs are all in hierarchical states 1 and 2, which may indicate that the aircraft only experienced states 1 and 2 in the typical training legs. Thus, states 1 and 2 can be considered as normal operational states of the aircraft.

On the other hand, FIG. 8(b) illustrates the non-majority cluster legs. As shown, a portion of the data from the non-majority cluster legs is in hierarchical states 4 and 5, as indicated by circles 801 and 802. The portion of the data from the non-majority cluster legs may be also in state 3 which is not shown in FIG. 8(b). In one example, the system 100 is configured to identify states 3-5 as "atypical states" or "fault states." This is because states 3-5 are not in common with any normal states containing data (i.e., states 1-2) in the majority cluster legs. In one example, the system 100 is configured to detect fault states based on streaming data from the aircraft 106. If the streaming data for any one of a plurality of points in time is assigned to states 3, 4, or 5, the system 100 can identify that the data has experienced a fault state and can generate an alert.

FIG. 9 is a flowchart illustrating various operations in a method 900 of detecting fault states of an aircraft, according to various example implementations. As shown at block 901, the method 900 includes receiving training data including operational parameters 201-204 of an aircraft (e.g., the aircraft 106) operating over a plurality of training flight legs. In one example, block 901 may include the operation at block 301 of FIG. 3. At block 902, the method 900 includes applying a first clustering algorithm separately to the training data for each of the plurality of training flight legs to produce first clustered data. The first clustering algorithm is configured to cluster the operational parameters into one or more respective clusters 211-214 for each of the plurality of training flight legs. In one example, block 902 may include the operations at blocks 302 and 303 of FIG. 3.

At block 903, the method 900 includes applying a second clustering algorithm to the first clustered data to produce second clustered data 215 that indicates a plurality of states describing behavior of the aircraft 106 operating over the plurality of training legs. In one example, block 903 may include the operations at blocks 304-306 of FIG. 3. At block 904, the method 900 includes applying a third clustering algorithm to identify one or more fault states of the aircraft 106 from the plurality of states based on the training data and the second clustered data. In one example, block 904 may include the operations at blocks 401-404 of FIG. 4.

At block 905, the method 900 includes establishing a digital datalink 105 with the aircraft 106. At block 906, the method 900 includes receiving messages carrying data from the aircraft 106 over the digital datalink 105. At block 907, the method 900 includes detecting a fault state of the one or more fault states from the data; and in response, at block 908, the method 900 includes generating an alert. In one example, block 907 may include the operations at blocks 501-503 of FIG. 5.

According to example implementations of the present disclosure, the system 100 and its subsystems including the data receiving module 101, the clustering module 102, the identifying module 103 and the detecting module 104 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

FIG. 10 illustrates an apparatus 1000 according to some example implementations. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 1001 (e.g., processing circuitry) connected to a memory 1002 (e.g., storage device).

The processor 1001 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 1002 (of the same or another apparatus).

The processor 1001 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more ASICs, FPGAs or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 1002 is generally any piece of computer hardware that is capable of storing information such as, for example, data, computer programs (e.g., computer-readable program code 1003) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1002, the processor 1001 may also be connected to one or more interfaces for displaying, transmitting and/or receiving information. The interfaces may include a communications interface 1004 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1006 and/or one or more user input interfaces 1005 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 1000 may include a processor 1001 and a computer-readable storage medium or memory 1002 coupled to the processor, where the processor is configured to execute computer-readable program code 1003 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus that detects one or more fault states of an aircraft, the apparatus comprising a processor and a memory storing executable instructions that, in response to execution by the processor, cause the apparatus to at least:
    receive training data including operational parameters of the aircraft operating over a plurality of training flight legs;
    apply a first clustering algorithm separately to the training data for each of the plurality of training flight legs to produce first clustered data, the first clustering algorithm being configured to cluster the operational parameters into one or more respective clusters for each of the plurality of training flight legs;
    apply a second clustering algorithm to the first clustered data to produce second clustered data that indicates a plurality of states describing behavior of the aircraft operating over the plurality of training flight legs;
    apply a third clustering algorithm to the second clustered data to identify the one or more fault states of the aircraft from the plurality of states based on the training data and the second clustered data;
    establish a digital datalink with the aircraft;
    receive messages carrying data from the aircraft over the digital datalink;
    detect a fault state of the one or more fault states from the data; and in response,
    generate an alert.

2. The apparatus of claim 1, wherein the apparatus being caused to apply the third clustering algorithm includes being caused to:
    identify each of the plurality of training flight legs as a first type of flight leg in which the training data describes the aircraft in a first set of the plurality of states, or a second type of flight leg in which the training data describes the aircraft in a second set of the plurality of states, based on the training data and the second clustered data; and
    identify the one or more fault states of the aircraft from the plurality of states based on a difference in states between the first set of the plurality of states of the first type of flight leg and the second set of the plurality of states of the second type of flight leg.

3. The apparatus of claim 1, wherein the apparatus being caused to apply the first clustering algorithm includes being caused to apply the first clustering algorithm separately to the training data of each of a plurality of flight phases for each of the plurality of training flight legs.

4. The apparatus of claim 1, wherein the apparatus being caused to apply the second clustering algorithm includes being caused to produce a library including the second clustered data that indicates the plurality of states, and the apparatus being caused to apply the third clustering algorithm includes being caused to identify the one or more fault states based on the training data and the library.

5. The apparatus of claim 1, wherein the apparatus being caused to apply the first clustering algorithm includes being caused to apply a Dirichlet Process Gaussian Mixture Model (DPGMM), and the apparatus being caused to apply the second clustering algorithm includes being caused to apply a DPGMM or a Density Based Spatial Clustering of Applications with Noise (DBSCAN).

6. The apparatus of claim 1, wherein the apparatus being caused to apply the second clustering algorithm includes being caused to assign the training data for each of a plurality of points in time for each of the plurality of training flight legs separately to one of the plurality of states.

7. The apparatus of claim 1, wherein the apparatus being caused to detect the fault state includes being caused to at least:
    assign the data for each of a plurality of points in time separately to one of the plurality of states; and
    detect that the data for one of the plurality of points in time is assigned to the fault state.

8. The apparatus of claim 1, wherein the apparatus being caused to apply the third clustering algorithm includes being caused to apply the third clustering algorithm to a histogram of the second clustered data for each of the plurality of training flight legs.

9. A method that detects one or more fault states of an aircraft, the method comprising:
    receiving training data including operational parameters of the aircraft operating over a plurality of training flight legs;
    applying a first clustering algorithm separately to the training data for each of the plurality of training flight legs to produce first clustered data, the first clustering algorithm being configured to cluster the operational parameters into one or more respective clusters for each of the plurality of training flight legs;

applying a second clustering algorithm to the first clustered data to produce second clustered data that indicates a plurality of states describing behavior of the aircraft operating over the plurality of training flight legs;

applying a third clustering algorithm to the second clustered data to identify the one or more fault states of the aircraft from the plurality of states based on the training data and the second clustered data;

establishing a digital datalink with the aircraft;

receiving messages carrying data from the aircraft over the digital datalink;

detecting a fault state of the one or more fault states from the data; and in response, generating an alert.

10. The method of claim 9, wherein applying the third clustering algorithm includes:

identifying each of the plurality of training flight legs as a first type of flight leg in which the training data describes the aircraft in a first set of the plurality of states, or a second type of flight leg in which the training data describes the aircraft in a second set of the plurality of states, based on the training data and the second clustered data; and identifying the one or more fault states of the aircraft from the plurality of states based on a difference in states between the first set of the plurality of states of the first type of flight leg and the second set of the plurality of states of the second type of flight leg.

11. The method of claim 9, wherein applying the first clustering algorithm includes applying the first clustering algorithm separately to the training data of each of a plurality of flight phases for each of the plurality of training flight legs.

12. The method of claim 9, wherein applying the second clustering algorithm includes producing a library including the second clustered data that indicates the plurality of states, and wherein applying the third clustering algorithm includes identifying the one or more fault states based on the training data and the library.

13. The method of claim 9, wherein applying the first clustering algorithm includes applying a Dirichlet Process Gaussian Mixture Model (DPGMM), and wherein applying the second clustering algorithm includes applying a DPGMM or a Density Based Spatial Clustering of Applications with Noise (DBSCAN).

14. The method of claim 9, wherein applying the second clustering algorithm includes assigning the training data for each of a plurality of points in time for each of the plurality of training flight legs separately to one of the plurality of states.

15. The method of claim 9, wherein detecting the fault state includes at least:

assigning the data for each of a plurality of points in time separately to one of the plurality of states; and detecting that the data for one of the plurality of points in time is assigned to the fault state.

16. The method of claim 9, wherein applying the third clustering algorithm includes applying the third clustering algorithm to a histogram of the second clustered data for each of the plurality of training flight legs.

17. A computer-readable storage medium, the computer-readable storage medium being non-transitory and having computer-readable program code stored therein that in response to execution by a processor, causes an apparatus to at least:

receive training data including operational parameters of an aircraft operating over a plurality of training flight legs;

apply a first clustering algorithm separately to the training data for each of the plurality of training flight legs to produce first clustered data, the first clustering algorithm being configured to cluster the operational parameters into one or more respective clusters for each of the plurality of training flight legs;

apply a second clustering algorithm to the first clustered data to produce second clustered data that indicates a plurality of states describing behavior of the aircraft operating over the plurality of training flight legs;

apply a third clustering algorithm to the second clustered data to identify one or more fault states of the aircraft from the plurality of states based on the training data and the second clustered data;

establish a digital datalink with the aircraft;

receive messages carrying data from the aircraft over the digital datalink;

detect a fault state of the one or more fault states from the data; and in response, generate an alert.

18. The computer-readable storage medium of claim 17, wherein the apparatus being caused to apply the third clustering algorithm includes being caused to:

identify each of the plurality of training flight legs as a first type of flight leg in which the training data describes the aircraft in a first set of the plurality of states, or a second type of flight leg in which the training data describes the aircraft in a second set of the plurality of states, based on the training data and the second clustered data; and identify the one or more fault states of the aircraft from the plurality of states based on a difference in states between the first set of the plurality of states of the first type of flight leg and the second set of the plurality of states of the second type of flight leg.

19. The computer-readable storage medium of claim 17, wherein the apparatus being caused to apply the first clustering algorithm includes being caused to apply the first clustering algorithm separately to the training data of each of a plurality of flight phases for each of the plurality of training flight legs.

20. The computer-readable storage medium of claim 17, wherein the apparatus being caused to apply the second clustering algorithm includes being caused to produce a library including the second clustered data that indicates the plurality of states, and the apparatus being caused to apply the third clustering algorithm includes being caused to identify the one or more fault states based on the training data and the library.

21. The computer-readable storage medium of claim 17, wherein the apparatus being caused to apply the first clustering algorithm includes being caused to apply a Dirichlet Process Gaussian Mixture Model (DPGMM), and the apparatus being caused to apply the second clustering algorithm includes being caused to apply a DPGMM or a Density Based Spatial Clustering of Applications with Noise (DBSCAN).

22. The computer-readable storage medium of claim 17, wherein the apparatus being caused to apply the second clustering algorithm includes being caused to assign the training data for each of a plurality of points in time for each of the plurality of training flight legs separately to one of the plurality of states.

23. The computer-readable storage medium of claim 17, wherein the apparatus being caused to detect the fault state includes being caused to at least:
   assign the data for each of a plurality of points in time separately to one of the plurality of states; and
   detect that the data for one of the plurality of points in time is assigned to the fault state.

24. The computer-readable storage medium of claim 17, wherein the apparatus being caused to apply the third clustering algorithm includes being caused to apply the third clustering algorithm to a histogram of the second clustered data for each of the plurality of training flight legs.

* * * * *